United States Patent [19]

Domer

[11] Patent Number: 5,013,166
[45] Date of Patent: May 7, 1991

[54] TORSION BAR BEARING

[75] Inventor: Michel Domer, Valdampierre, France

[73] Assignee: Hutchinson, France

[21] Appl. No.: 472,635

[22] Filed: Jan. 30, 1990

[30] Foreign Application Priority Data

Jan. 31, 1989 [FR] France .................................. 89 01188

[51] Int. Cl.⁵ .......................... F16C 27/06; F16F 1/38
[52] U.S. Cl. .................................. 384/220; 267/276; 384/281; 384/295
[58] Field of Search ........ 384/125, 215, 217, 220-222, 384/280, 281, 295, 297-301; 267/276, 279, 281, 154; 280/695, 671, 673, 716, 717

[56] References Cited

U.S. PATENT DOCUMENTS

| | | | |
|---|---|---|---|
| 1,993,260 | 3/1935 | Burns | 267/281 |
| 2,761,714 | 9/1956 | Cuskie | |
| 3,194,615 | 7/1965 | Weasler | 384/220 |
| 3,848,839 | 11/1974 | Tillman | 384/222 X |
| 4,671,678 | 6/1987 | Münch | 384/125 |

FOREIGN PATENT DOCUMENTS

| | | |
|---|---|---|
| 0132502 | 2/1985 | European Pat. Off. . |
| 2358736 | 6/1975 | Fed. Rep. of Germany . |
| 1516572 | 7/1978 | United Kingdom ................ 267/279 |
| 2074696 | 11/1981 | United Kingdom . |

Primary Examiner—Thomas R. Hannon
Attorney, Agent, or Firm—Larson and Taylor

[57] ABSTRACT

A torsion bar bearing is disclosed, comprising a relatively rigid frame (1) which can be locked on the bar and having inwardly resilient material ribs (5) parallel to the axis of the bar and adapted to grip it when the frame is locked. A resilient material pad (6) more flexible than the ribs is fixed externally to the frame (1) for absorbing the torsion forces. The frame may be formed of two half-shells (1a, 1b) connected together by a hinge (2) and/or being snap-fitted one on the other by a snap-fit mechanism (3, 4) provided opposite the hinge or on each side of the half-shells.

6 Claims, 2 Drawing Sheets

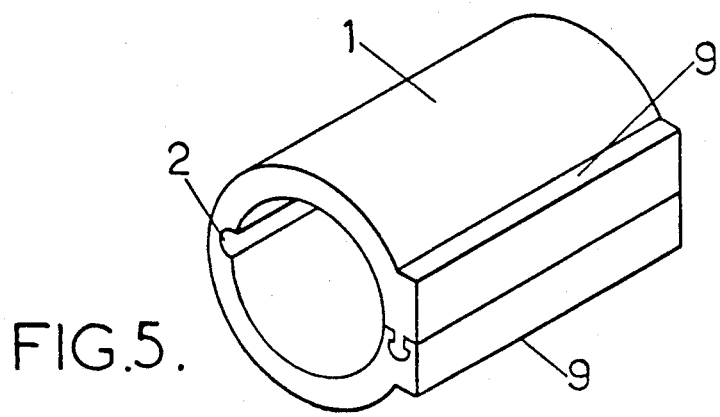
FIG.5.
FIG.6.
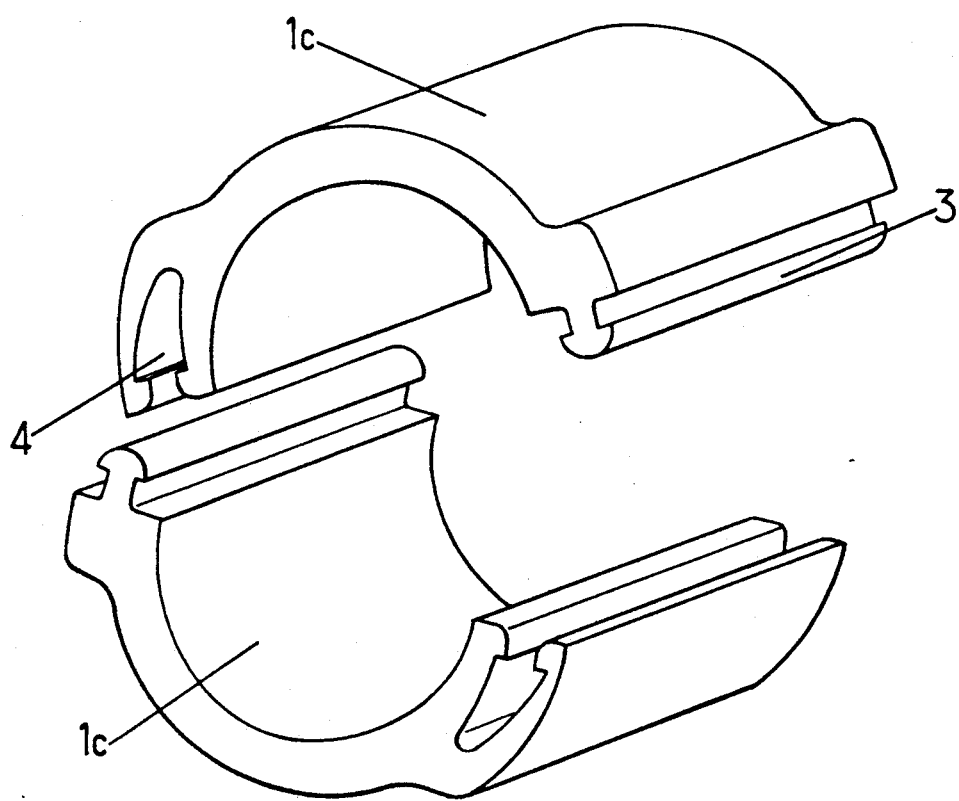

TORSION BAR BEARING

The present invention relates to a torsion bar bearing, in particular an anti-roll bar for a motor vehicle.

Among the anti-roll bar bearings known for motor vehicles, some allow the bar to swivel, but that requires the bar having an excellent surface condition in the corresponding zones, which is difficult to obtain. Furthermore, since such bearings are subjected to splashing from the road, they must be sealed, which is a great problem. Finally, and with the reservation of considerable complication, these bearings do not provide axial clamping—which is often desirable—of the anti-roll bar.

Other bearings, on the contrary are locked on the bar, with intermediate resilient material working under torsion, which allows the desired axial clamping. Since these bearings cannot be fitted on the bars, if only simply because of the different shapes which their ends may have, bearings in the form of jaws must be used, which need to be closed on the bars and locked thereon. These bearings are consequently difficult to produce.

Direct adhesion of the bearings on the bars has also been tried but this is a difficult operation and which further makes exchange of the bearings very problematic. The purpose of the present invention is to solve these problems without having the drawbacks of the prior technique.

For this, a torsion bar bearing in accordance with the invention will be essentially characterized in that it comprises:

a relatively rigid frame, formed of two opposite half-shells of a general semi-cylindrical shape which allows it to be fitted then closed on a torsion bar, a closure means then locking it on the bar;

resilient material ribs, integral with the inner face of said frame and extending substantially along generatrices of said half-shells, these ribs being adapted to nip the bar when said frame is locked thereon;

and a resilient material pad more flexible than said ribs which is fast externally with said frame and is adapted to be locked in a support means of the vehicle, this pad being adapted to work under torsion during operation of the bar.

It will be readily understood that the resilient material (elastomer or similar) ribs will efficiently lock the bearing on the bar, both axially and under torsion, while following the helical deformations of this bar during operation.

It is however the resilient material of said pad, as a general rule thicker than said ribs, which will absorb the essential part of the torsional movements. In any case, it can be seen that this type of bearing in accordance with the invention will avoid, during operation, the friction, wear and squeaking noises which frequently affect known bearings.

Preferably, said means for closing said frame is a snap-fit means, provided either opposite a hinge connecting the two half-shells together on one side, or on opposite edges, of these half-shells and providing irreversible locking on said bar.

Thus, very reliable fixing of the bearing on the bar is provided. If required, the bearing may however be destroyed so as to change it and fit a new one in its place on the bar, the latter, which is a costly part, being re-used.

According to another characteristic of the invention, said resilient material pad may have externally a profiled shape, so as to permit axial positioning of the frame with respect to said bar.

It may for example comprise a projection which is adapted, when fitting, to be housed in a corresponding recess in a mount integral with the vehicle.

Furthermore, in order to facilitate snap-fitting of the closure means, it will be advantageous for said resilient material pad to leave the ends of said frame uncovered.

That will facilitate the automatic nipping of the frame, and locking thereof on the bar without the risk of damaging said pad.

To the same end, said frame may also have at the level of its closure means and on each half-shell, bearing surfaces for a gripping device or similar, which are accessible at least locally through notches formed in said pad.

That may facilitate snap-fitting of the closure means, at least in the central part of the frame in the case, in particular, where said closure means—of the type comprising a rib and groove of complementary shapes which snap-fit resiliently together—extends over the whole length of the frame.

Two embodiments of the invention will now be described by way of examples which are in no wise limitative, with reference to the accompanying drawings in which:

FIG. 5 is a perspective view of the frame alone of the bearing; and

FIG. 6 is a perspective view similar to that of FIG. 5, showing a variant with hingeless frame.

Figure 1:
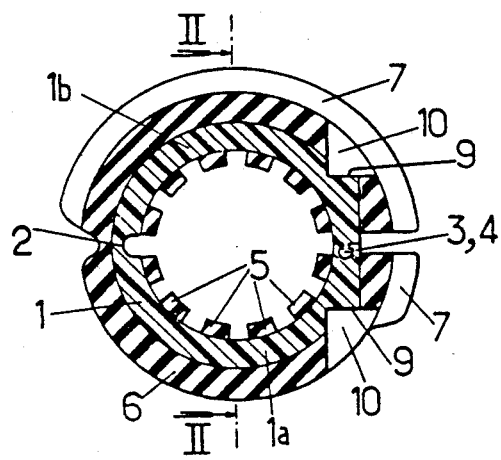
FIG. 1 is a cross-sectional view of a hinge bearing in accordance with the invention, through line I—I of FIG. 2.
Figure 2:
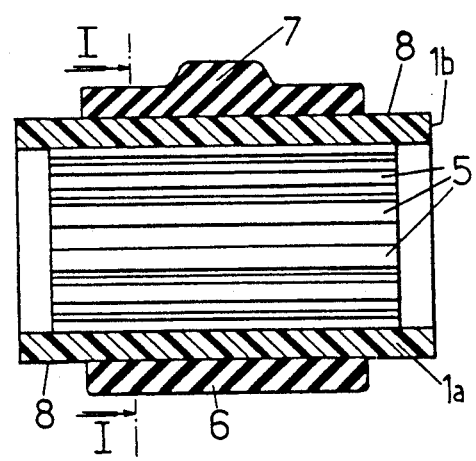
FIG. 2 is a longitudinal and axial sectional view of this bearing, through line II—II of FIG. 1.
Figure 3:
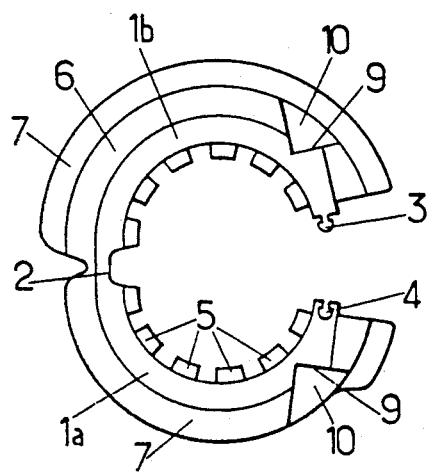
FIG. 3 is an end view, the bearing being open instead of closed.

The relatively rigid frame—for example made from a plastic material—has been referenced at 1. It is formed of two semi-cylindrical half-shells 1a and 1b connected together by an integrally moulded hinge 2. These two half-shells may be closed on a torsion bar (not shown) and be locked thereon, both axially and against rotation, by a snap-fit closure means which extends all along the free edges of these half-shells, namely those opposite hinge 2. For this, this closure means may be formed of a rib 3 on the edge of half-shell 1b adapted for resiliently snap-fitting, with possibility of disengaging, in a groove of complementary shape 4 provided in the facing edge of the other half-shell 1a.

At 5 have been referenced elastomer ribs integral with the inner face of frame 1 and which extend along generatrices of the half-shells 1a and 1b. The role of these ribs 5 has been described above.

At 6 has been shown a resilient material pad, also made from elastomer, which is thicker than ribs 5 and is fast externally with frame 1. Its essential purpose is to absorb the deformations under torsion during operation of the bar. It has a central projection 7 which also permits axial positioning of frame 1 with respect to the torsion bar, as mentioned above.

Finally, it should be noted that, in order to allow ready clipping of the bearing on the bar by means of a gripping device or similar, pad 6 leaves the ends of frame 1 uncovered at 8. For the same purpose, the half-shells 1a and 1b have, at the level of closure means 3, 4, bearing surfaces 9. They are accessible through notches 10 formed at the desired positions in pad 6.

The embodiment which has just been described may sometimes raise a problem as to the choice of material forming frame 1. In order to provide good snap-fitting of the closure means, it is advisable to choose a relatively rigid material, such as reinforced polyamide, but then this material may be too rigid at the level of hinge 2, which requires a certain flexibility.

Figure 4:
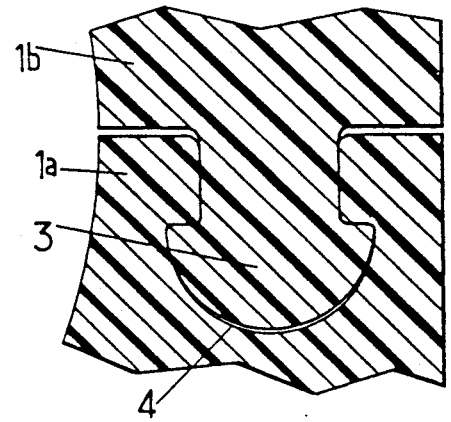
FIG. 4 is a partial cross-sectional view on a larger scale showing the snap-fit means of the irreversible locking closure.

This is why the hingeless variant has been perfected, with double snap-fitting, as shown in FIG. 6. In this variant, frame 1 is formed of two relatively rigid half-shells, preferably identical 1c, and which are able to snap-fit one in the other head to tail. On each edge of the half-shells the snap-fit means may be of the same general type as that shown in FIG. 4, namely with rib 3 and complementary coupling groove 4. This embodiment also has the advantage of facilitating fitting of frame 1, since it is then formed of two open half-shells and which in addition may be exactly identical. These two half-shells may even be coupled without force fitting by sliding each rib 3 of one into the corresponding groove 4 of the other, if the force required for achieving such sliding is not excessive because of friction.

On each edge of the half-shells, the snap-fitted rib and groove may further form together a sort of hinge which, as in the first embodiment described, would make it possible to fasten the two half-shells together before fitting them on the bar, while allowing them to pivot slightly one on the other.

I claim:

1. A torsion bar bearing, in particular an anti-roll bar bearing for a motor vehicle, characterized in that it comprises:

a relatively rigid frame having an inner face and two ends, said frame being formed of two opposite half-shells each being of a general semi-cylindrical shape which allows said inner face to be closely fitted on a torsion bar and locked thereon by a closure means;

resilient material ribs, integral with said inner face of said frame and extending substantially along generatrices of said half-shells, said ribs being adapted to nip the bar when said frame is locked thereon;

and a resilient material pad more flexible than said ribs, which is fastened externally to said frame and is adapted to be locked in a support means of the vehicle, said pad being adapted to work under torsion during operation of the bar.

2. Bearing according to claim 1, characterized in that said closure means is a snap-fit means, provided opposite a hinge, said snap-fit means connecting said two half-shells together and providing irreversible locking thereof on said bar.

3. Bearing according to claim 1, characterized in that said closure means comprise snap-fit means along opposite edges of said half-shells, such that said half-shells are identical to one another and snap-fit one on the other in a head-to-tail position.

4. Bearing according to claim 1, characterized in that said resilient material pad has outwardly a profiled shape so as to permit positioning of said frame with respect to said bar.

5. Bearing according to claim 1, characterized in that said resilient material pad leaves said ends of said frame uncovered.

6. Bearing according to claim 1, characterized in that said frame has, at the level of said closure means and on each half-shell, bearing surfaces for a gripping means, which are accessible through notches formed in said pad.

* * * * *